United States Patent
Hong

(10) Patent No.: US 10,109,094 B2
(45) Date of Patent: Oct. 23, 2018

(54) INTERFACE TO INDEX AND DISPLAY GEOSPATIAL DATA

(71) Applicant: Palantir Technologies Inc., Palo Alto, CA (US)

(72) Inventor: Peter Hong, Kalamazoo, MI (US)

(73) Assignee: Palantir Technologies Inc., Palo Alto, CA (US)

( * ) Notice: Subject to any disclaimer, the term of this patent is extended or adjusted under 35 U.S.C. 154(b) by 28 days.

(21) Appl. No.: 15/258,715

(22) Filed: Sep. 7, 2016

(65) Prior Publication Data

US 2017/0178376 A1 Jun. 22, 2017

Related U.S. Application Data

(60) Provisional application No. 62/270,510, filed on Dec. 21, 2015.

(51) Int. Cl.
| | |
|---|---|
| *G06T 11/60* | (2006.01) |
| *G06T 11/20* | (2006.01) |
| *G06F 17/30* | (2006.01) |
| *G06F 3/0484* | (2013.01) |

(52) U.S. Cl.
CPC ........ *G06T 11/60* (2013.01); *G06F 17/30241* (2013.01); *G06T 11/206* (2013.01); *G06F 3/04847* (2013.01); *G06T 2200/24* (2013.01)

(58) Field of Classification Search
CPC ... G06T 11/206; G06T 11/60; G06F 17/30241
See application file for complete search history.

(56) References Cited

U.S. PATENT DOCUMENTS

| | | |
|---|---|---|
| 4,899,161 A | 2/1990 | Morin, Jr. et al. |
| 4,958,305 A | 9/1990 | Piazza |
| 5,329,108 A | 7/1994 | Lamoure |

(Continued)

FOREIGN PATENT DOCUMENTS

| | | |
|---|---|---|
| AU | 2012216622 | 5/2015 |
| DE | 102013222023 A1 | 1/2015 |

(Continued)

OTHER PUBLICATIONS

"A First Look: Predicting Market Demand for Food Retails using a Huff Analysis", TRF Policy Solutions, CDFI Fund, Capacity Building Initiative, (Jul. 2012), 1-30.

(Continued)

*Primary Examiner* — Jeffery A Brier
(74) *Attorney, Agent, or Firm* — Schwegman Lundberg & Woessner, P.A.

(57) ABSTRACT

Example embodiments described herein pertain to a geospatial interface system configured to cause display of geospatial data within a graphical user interface at a client device, receive data points from multiple data sources, unify the data points, and present the unified data points as interactive graphical elements within the graphical user interface, in a presentation layer separate from the geospatial data. In example embodiments, the geospatial interface system may be or include a group of one or more server machines configured to provide one or more geospatial data display, indexing, and management services. A client device may accordingly display a graphical user interface generated by the geospatial interface system.

20 Claims, 12 Drawing Sheets

(56) References Cited

U.S. PATENT DOCUMENTS

| | | |
|---|---|---|
| 5,754,182 A | 5/1998 | Kobayashi |
| 5,781,195 A | 7/1998 | Marvin |
| 5,781,704 A | 7/1998 | Rossmo |
| 6,091,956 A | 7/2000 | Hollenberg |
| 6,100,897 A | 8/2000 | Mayer et al. |
| 6,157,747 A | 12/2000 | Szeliski et al. |
| 6,169,552 B1 | 1/2001 | Endo et al. |
| 6,173,067 B1 | 1/2001 | Payton et al. |
| 6,178,432 B1 | 1/2001 | Cook et al. |
| 6,247,019 B1 | 6/2001 | Davies |
| 6,389,289 B1 | 5/2002 | Voce |
| 6,414,683 B1 | 7/2002 | Gueziec |
| 6,483,509 B1 | 11/2002 | Rabenhorst |
| 6,529,900 B1 | 3/2003 | Patterson et al. |
| 6,631,496 B1 | 10/2003 | Li et al. |
| 6,662,103 B1 | 12/2003 | Skolnick et al. |
| 6,757,445 B1 | 6/2004 | Knopp |
| 6,828,920 B2 | 12/2004 | Owen et al. |
| 6,983,203 B1 | 1/2006 | Wako |
| 6,985,950 B1 | 1/2006 | Hanson et al. |
| 7,036,085 B2 | 4/2006 | Barros |
| 7,158,878 B2 | 1/2007 | Rasmussen |
| 7,375,732 B2 | 5/2008 | Arcas |
| 7,379,811 B2 | 5/2008 | Rasmussen et al. |
| 7,457,706 B2 | 11/2008 | Melero |
| 7,502,786 B2 | 3/2009 | Liu et al. |
| 7,519,470 B2 | 4/2009 | Brasche et al. |
| 7,529,195 B2 | 5/2009 | Gorman |
| 7,539,666 B2 | 5/2009 | Ashworth et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,617,314 B1 | 11/2009 | Bansod |
| 7,620,628 B2 | 11/2009 | Kapur et al. |
| 7,663,621 B1 | 2/2010 | Allen |
| 7,791,616 B2 | 9/2010 | Loup et al. |
| 7,805,457 B1 | 9/2010 | Viola et al. |
| 7,809,703 B2 | 10/2010 | Balabhadrapatruni et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,920,963 B2 | 4/2011 | Jouline et al. |
| 7,945,852 B1 | 5/2011 | Pilskains |
| 7,962,281 B2 | 6/2011 | Rasmussen et al. |
| 7,970,240 B1 | 6/2011 | Chao et al. |
| 8,010,545 B2 | 8/2011 | Stefik et al. |
| 8,036,632 B1 | 10/2011 | Cona et al. |
| 8,065,080 B2 | 11/2011 | Koch |
| 8,085,268 B2 | 12/2011 | Carrino et al. |
| 8,134,457 B2 | 3/2012 | Velipasalar et al. |
| 8,145,703 B2 | 3/2012 | Frishert et al. |
| 8,200,676 B2 | 6/2012 | Frank |
| 8,214,361 B1 | 7/2012 | Sandler et al. |
| 8,214,764 B2 | 7/2012 | Gemmell et al. |
| 8,229,947 B2 | 7/2012 | Fujinaga |
| 8,230,333 B2 | 7/2012 | Decherd et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,325,178 B1 | 12/2012 | Doyle et al. |
| 8,368,695 B2 | 2/2013 | Howell et al. |
| 8,397,171 B2 | 3/2013 | Klassen et al. |
| 8,400,448 B1 | 3/2013 | Doyle |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,514,229 B2 | 8/2013 | Cervelli et al. |
| 8,515,207 B2 | 8/2013 | Chau |
| 8,564,596 B2 | 10/2013 | Carrino et al. |
| 8,742,934 B1 | 6/2014 | Sarpy, Sr. et al. |
| 8,781,169 B2 | 7/2014 | Jackson et al. |
| 8,799,799 B1 | 8/2014 | Cervelli et al. |
| 8,830,322 B2 | 9/2014 | Nerayoff et al. |
| 8,938,686 B1 | 1/2015 | Erenrich et al. |
| 8,949,164 B1 | 2/2015 | Mohler |
| 8,984,099 B1 | 3/2015 | Giencke et al. |
| 9,009,177 B2 | 4/2015 | Zheng et al. |
| 9,021,384 B1 | 4/2015 | Beard et al. |
| 9,104,293 B1 | 8/2015 | Kornfeld et al. |
| 9,104,695 B1 | 8/2015 | Cervelli et al. |
| 9,111,380 B2 | 8/2015 | Piemonte et al. |
| 9,129,219 B1 | 9/2015 | Robertson et al. |
| 9,146,125 B2 | 9/2015 | Vulcano et al. |
| 9,460,175 B1 | 10/2016 | Hong |
| 2002/0003539 A1 | 1/2002 | Abe |
| 2002/0033848 A1 | 3/2002 | Sciammarella et al. |
| 2002/0116120 A1 | 8/2002 | Ruiz et al. |
| 2002/0130867 A1 | 9/2002 | Yang et al. |
| 2002/0130906 A1 | 9/2002 | Miyaki |
| 2003/0052896 A1 | 3/2003 | Higgins et al. |
| 2003/0103049 A1 | 6/2003 | Kindatenko et al. |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2004/0030492 A1 | 2/2004 | Fox et al. |
| 2004/0039498 A1 | 2/2004 | Ollis et al. |
| 2004/0098236 A1 | 5/2004 | Mayer et al. |
| 2004/0143602 A1 | 7/2004 | Ruiz et al. |
| 2005/0031197 A1 | 2/2005 | Knopp |
| 2005/0034062 A1 | 2/2005 | Bufkin et al. |
| 2005/0080769 A1 | 4/2005 | Gemmell et al. |
| 2005/0134607 A1* | 6/2005 | Purdy ............... G06T 11/206 |
| | | 345/629 |
| 2005/0162523 A1 | 7/2005 | Darrell et al. |
| 2005/0182502 A1 | 8/2005 | Iyengar |
| 2005/0182793 A1 | 8/2005 | Keenan et al. |
| 2005/0223044 A1 | 10/2005 | Ashworth et al. |
| 2005/0267652 A1 | 12/2005 | Allstadt et al. |
| 2006/0026170 A1 | 2/2006 | Kreitler et al. |
| 2006/0139375 A1 | 6/2006 | Rasmussen et al. |
| 2006/0146050 A1 | 7/2006 | Yamauchi |
| 2006/0149596 A1 | 7/2006 | Surpin et al. |
| 2006/0197837 A1 | 9/2006 | Flath et al. |
| 2006/0200384 A1 | 9/2006 | Arutunian et al. |
| 2006/0241974 A1 | 10/2006 | Chao et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0078832 A1 | 4/2007 | Ott, IV et al. |
| 2007/0115373 A1 | 5/2007 | Gallagher et al. |
| 2007/0188516 A1 | 8/2007 | Ioup et al. |
| 2007/0208497 A1 | 9/2007 | Downs et al. |
| 2007/0208498 A1 | 9/2007 | Barker et al. |
| 2007/0258642 A1 | 11/2007 | Thota |
| 2007/0294643 A1 | 12/2007 | Kyle |
| 2008/0010605 A1 | 1/2008 | Frank |
| 2008/0021726 A1 | 1/2008 | Evans et al. |
| 2008/0040684 A1 | 2/2008 | Crump et al. |
| 2008/0077642 A1 | 3/2008 | Carbone |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0163073 A1 | 7/2008 | Becker et al. |
| 2008/0192053 A1 | 8/2008 | Howell |
| 2008/0195417 A1 | 8/2008 | Surpin |
| 2008/0223834 A1 | 9/2008 | Griffiths et al. |
| 2008/0229056 A1 | 9/2008 | Agarwal et al. |
| 2008/0263468 A1 | 10/2008 | Cappione et al. |
| 2008/0267107 A1 | 10/2008 | Rosenberg |
| 2008/0270468 A1 | 10/2008 | Mao et al. |
| 2008/0278311 A1 | 11/2008 | Grange et al. |

(56) References Cited

U.S. PATENT DOCUMENTS

| | | |
|---|---|---|
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shimasaki et al. |
| 2009/0132921 A1 | 5/2009 | Hwangbo et al. |
| 2009/0132953 A1 | 5/2009 | Reed, Jr. et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford et al. |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0162176 A1 | 6/2010 | Dunton |
| 2010/0198684 A1 | 8/2010 | Eraker et al. |
| 2010/0199225 A1 | 8/2010 | Coleman et al. |
| 2010/0277611 A1 | 11/2010 | Holt et al. |
| 2010/0293174 A1 | 11/2010 | Bennett |
| 2010/0321399 A1 | 12/2010 | Ellren et al. |
| 2011/0022312 A1 | 1/2011 | McDonough et al. |
| 2011/0090254 A1 | 4/2011 | Carrino et al. |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0260860 A1* | 10/2011 | Gupta .................. G06Q 30/02 340/539.13 |
| 2011/0270705 A1 | 11/2011 | Parker |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0144335 A1 | 6/2012 | Abeln et al. |
| 2012/0158527 A1 | 6/2012 | Cannelongo |
| 2012/0159363 A1 | 6/2012 | DeBacker et al. |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221580 A1 | 8/2012 | Barney |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0100134 A1 | 4/2013 | Cervelli et al. |
| 2013/0101159 A1 | 4/2013 | Chao et al. |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0254900 A1 | 9/2013 | Sathish et al. |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0339891 A1 | 12/2013 | Blumenberg |
| 2014/0176606 A1 | 6/2014 | Narayan et al. |
| 2014/0218400 A1 | 8/2014 | O'Toole et al. |
| 2014/0333651 A1 | 11/2014 | Cervelli et al. |
| 2014/0337772 A1 | 11/2014 | Cervelli et al. |
| 2014/0361899 A1 | 12/2014 | Layson |
| 2015/0029176 A1 | 1/2015 | Baxter |
| 2015/0100907 A1 | 4/2015 | Erenrich et al. |
| 2015/0106170 A1 | 4/2015 | Bonica |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0312323 A1 | 10/2015 | Peterson |
| 2015/0338233 A1 | 11/2015 | Cervelli et al. |
| 2015/0347457 A1 | 12/2015 | Zhu et al. |
| 2015/0370828 A1 | 12/2015 | Maurer et al. |
| 2015/0379413 A1 | 12/2015 | Robertson et al. |

FOREIGN PATENT DOCUMENTS

| | | |
|---|---|---|
| EP | 0763201 | 11/1995 |
| EP | 2575107 A2 | 4/2013 |
| EP | 2858014 A2 | 4/2015 |
| EP | 2963595 A1 | 1/2016 |
| EP | 3185147 A1 | 6/2017 |
| GB | 2516155 A | 1/2015 |
| NL | 2012778 A | 11/2014 |
| NZ | 624557 A | 8/2014 |
| WO | WO-9532424 A1 | 11/1995 |
| WO | WO-2000009529 A2 | 2/2000 |
| WO | WO-2001098925 A2 | 12/2001 |
| WO | WO-2004057268 A2 | 7/2004 |
| WO | WO-2005013200 A1 | 2/2005 |
| WO | WO-2008064207 A2 | 5/2008 |
| WO | WO-2009061501 A1 | 5/2009 |
| WO | WO-2009123975 A1 | 10/2009 |
| WO | WO-2011058507 A1 | 5/2011 |

OTHER PUBLICATIONS

"Amm's diary", Open Street Map, [Online]. Retrieved from the Internet: <URL: http://www.openstreetmap.org/user/amm/diary>, (Accessed: Jul. 23, 2012), 3 pgs.

"U.S. Appl. No. 12/840,673, Final Office Action dated Jan. 2, 2015", 21 pgs.

"U.S. Appl. No. 12/840,673, Non Final Office Action dated Sep. 17, 2014", 21 pgs.

"U.S. Appl. No. 12/840,673, Notice of Allowance dated Apr. 6, 2015", 11 pgs.

"U.S. Appl. No. 13/728,879, Final Office Action dated Aug. 12, 2015", 9 pgs.

"U.S. Appl. No. 13/728,879, First Action Interview Office Action Summary dated Mar. 17, 2015", 5 pgs.

"U.S. Appl. No. 13/728,879, First Action Interview Pre-Interview Communication dated Jan. 27, 2015", 4 pgs.

"U.S. Appl. No. 13/728,879, Non Final Office Action dated Nov. 20, 2015", 9 pgs.

"U.S. Appl. No. 13/917,571, Issue Notification dated Aug. 5, 2014", 1 pg.

"U.S. Appl. No. 13/948,859, Notice of Allowance dated Dec. 10, 2014", 8 pgs.

"U.S. Appl. No. 14/289,596, Advisory Action dated Apr. 30, 2015", 3 pgs.

"U.S. Appl. No. 14/289,596, Final Office Action dated Jan. 26, 2015", 38 pgs.

"U.S. Appl. No. 14/289,596, First Action Interview Pre-Interview Communication dated Jul. 18, 2014", 4 pgs.

"U.S. Appl. No. 14/289,599, Advisory Action dated Sep. 4, 2015", 24 pgs.

"U.S. Appl. No. 14/289,599, Final Office Action dated May 29, 2015", 8 pgs.

"U.S. Appl. No. 14/289,599, First Action Interview Pre-Interview Communication dated Jul. 22, 2014", 5 pgs.

"U.S. Appl. No. 14/294,098, Final Office Action dated Nov. 6, 2014", 22 pgs.

"U.S. Appl. No. 14/294,098, First Action Interview Pre-Interview Communication dated Aug. 15, 2014", 17 pgs.

"U.S. Appl. No. 14/294,098, Notice of Allowance dated Dec. 29, 2014", 9 pgs.

(56) References Cited

OTHER PUBLICATIONS

"U.S. Appl. No. 14/319,161, Final Office Action dated Jan. 23, 2015", 21 pgs.
"U.S. Appl. No. 14/319,161, Notice of Allowance dated May 4, 2015", 6 pgs.
"U.S. Appl. No. 14/490,612, Final Office Action dated Aug. 18, 2015", 71 pgs.
"U.S. Appl. No. 14/730,123, First Action Interview Pre-Interview Communication dated Sep. 21, 2015", 18 pgs.
"U.S. Appl. No. 14/730,123, Notice of Allowance dated Apr. 12, 2016", 10 pgs.
"U.S. Appl. No. 14/730,123, Pre-Interview First Office Action dated Dec. 7, 2015", 5 pgs.
"U.S. Appl. No. 14/730,123, Response filed Nov. 20, 2016 to Pre-Interview First Office Action dated Sep. 21, 2015", 1 pg.
"U.S. Appl. No. 14/730,123, Response filed Feb. 8, 2016 to First Action Interview Office Action dated Dec. 7, 2015", 18 pgs.
"U.S. Appl. No. 14/929,584, Non Final Office Action dated Feb. 4, 2016", 15 pgs.
"U.S. Appl. No. 14/934,004, First Action Interview Pre-Interview Communication dated Feb. 16, 2016", 5 pgs.
"U.S. Appl. No. 15/209,477, Non Final Office Action dated Jun. 6, 2017", 16 pgs.
"Australian Application Serial No. 2012216622, Office Action dated Jan. 6, 2015", 2 pgs.
"Australian Application Serial No. 2014202442, Office Action dated Mar. 19, 2015", 5 pgs.
"Australian Application Serial No. 2014213553, Office Action dated May 7, 2015", 2 pgs.
"Buffer a Polygon", VBForums, [Online]. Retrieved from the Internet: <URL: http://www.vbforums.com/showthread.php?198436-Buffer-a-Polygon>, (Accessed: Oct. 10, 2016), 13 pgs.
"Douglas-Peucker-Algorithmus", Wikipedia (W/ Machine Translation), [Online]. [Archived Jul. 29, 2011]. Retrieved from the Internet: <URL: http://de.wikipedia.org/w/index.php?title=Douglas-Peucker-Algorithmus&oldid=91846042">, (Last Modified: Jul. 29, 2011), 4 pgs.
"European Application Serial No. 14187739.9, Extended European Search Report dated Jul. 6, 2015", 9 pgs.
"European Application Serial No. 16172401.8, Extended European Search Report dated Oct. 7, 2016", 9 pgs.
"European Application Serial No. 16206016.4, Extended European Search Report dated May 17, 2017", 11 pgs.
"GIS-NET 3 Public Department of Regional Planning", http://gis.planning.lacounty.gov/GIS-NET3_Public/Viewer.htmll, (Oct. 2, 2013), 1-2.
"Great Britain Application Serial No. 1408025.3, Office Action dated Nov. 6, 2014", 3 pgs.
"How to georectify an image in ArcMap 10", [Online] Retrieved from the internet: http://web.archive.org/web/20140223140 531/http://gi s.une.edu/data/geog370/Georef erencingLabGEOG370_Spri ng2013.pdf, (Feb. 23, 2014), 1-8.
"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.
"Identify—Defintion", Downloaded Jan. 22, 2015, (Jan. 22, 2015), 1 pg.
"Map Builder: Rapid Mashup Development Tool for Google and Yahoo Maps!" http://web.archive.org/web/20090626224734/http://www.mapbuilder.net/, (Jul. 20, 2012), 2 pgs.
"Map of San Jose, CA", Retrieved Oct. 2, 2013 from http://maps.google.com, (Oct. 2, 2013), 1 pg.
"Map of San Jose, CA", Yahoo, [Online] retrieved from the internet: <http://maps.yahoo.com>, (Oct. 2, 2013), 1 pg.
"Map of San Jose, CA.", Retrieved Oct. 2, 2013 from http://maps.bing.com, (Oct. 2, 2013), 1 PG.
"Netherlands Application Serial No. 2011632, Netherlands Search Report dated Feb. 8, 2016", W/ English Translation, 9 pgs.
"Netherlands Application Serial No. 2012778, Netherlands Search Report dated Sep. 22, 2015", W/ English Translation, 10 pgs.
"New Zealand Application Serial No. 628585, Office Action dated Aug. 26, 2014", 2 pgs.
"New Zealand Application Serial No. 628840, Office Action dated Aug. 28, 2014", 2 pgs.
"Overlay—Definition", Downloaded Jan. 22, 2015, (Jan. 22, 2015), 1.
"Ramer-Douglas-Peucker algorithm", Wikipedia, [Online]. [Archived May 31, 2013]. Retrieved from the Internet: <URL: http://en wikipedia.orglw/index. php ?title=Ramer-DouglasPeucker_algorithm &oldid=557739119>, (Last Modified: May 31, 2013), 3 pgs.
"Using the Area of Interest Tools", Sonris, [Online]. Retrieved from the Internet: <URL: http://web.archive.org/web/20061001053327/ http://sonris-www.dnr.state.la.us/gis/instruct_files/tutslide12.htm>, (Oct. 1, 2006), 1 pg.
Aquino, J., et al., "JTS Topology Suite", Vivid Solutions, Technical Specifications Version 1.4, (Oct. 17, 2003), 1-36.
Barnes, Diane, et al., "Viewshed Analysis", GIS—ARC/INFO, (2001), 1-10.
Barto, "How To: Create Your Own Points of Interest", How to, [Online]. Retrieved from the Internet: <URL: http://www. poieditor .com/ articles/how to_create your_ own_points_of interest/>, (Jul. 2, 2008), 4 pgs.
Carver, Steve, et al., "Real-time visibility analysis and rapid viewshed calculation using a voxelbased modelling approach", (Apr. 13, 2012), 6 pgs.
Chen, et al., "Bringing Order to the Web: Automatically Categorizing Search Results", Proceedings of the SIGCHI conference on Human Factors in Computing Systems, The Hague, The Netherlands, (2000), 145-152.
Dramowicz, Ela, "Retail Trade Area Analysis Using the Huff Model", Directions Magazine,, [Online] retrieved from the internet: <http://www.directionsmag.com/articles/retail-trade-area-analysis-using-the-huff-model/123411>, (Jul. 2, 2005), 10 pgs.
Ghosh, Pijush K, "A Solution of Polygon Containment, Spatial Planning, and Other Related Problems Using Minkowski Operations", National Centre for Software Technology, Bombay India, (Feb. 15, 1989), 35 pgs.
Gorr, et al., "Crime Hot Spot Forecasting: Modeling and Comparative Evaluation", Grant 98-IJ-CX-K005, (May 6, 2002), 37 pgs.
Griffith, Daniel A, et al., "A Generalized Huff Model", Geographical Analysis, vol. 14, No. 2, (Apr. 1982), 135-144.
Haralick, Robert M, et al., "Image Analysis Using Mathematical Morphology", IEE Transactions on pattern analysis and machine intelligence, vol. PAMI-9, (Jul. 4, 1987), 19 pgs.
Hibbert, et al., "Prediction of Shopping Behavior Using a Huff Model Within a GIS Framework", (Mar. 18, 2011), 16 pgs.
Huang, DA Wei, et al., "Systematic and Integrative Analysis of Large Gene Lists Using DAVID Bioinformatics Resources", Nature Protocols, 4.1, (Dec. 2008), 44-57.
Huff, et al., "Calibrating the Huff Model Using ArcGIS Business Analyst", ESRI, (Sep. 2008), 33 pgs.
Huff, David L, "Parameter Estimation in the Huff Model", ESRI, ArcUser, (2003), 34-36.
Ipbucker, C, et al., "Inverse Transformation for Several Pseudo-cylindrical Map Projections Using Jacobian Matrix", ICCSA 2009, Part 1 LNCS 5592, (2009), 2 pgs.
Levine, Ned, "Crime Mapping and the Crimestat Program", Geographical Analysis, vol. 38, (2006), 41-56.
Liu, T., "Combining GIS and the Huff Model to Analyze Suitable Locations for a New Asian Supermarket in the Minneapolis and St. Paul, Minnesota USA", Papers in Resource Analysis, 2012, vol. 14, (2012), 8 pgs.
Mandagere, Nagapramod, "Buffer Operations in GIS", [Online]. Retrieved from the Internet: <URL: http://www-users.cs.umn.edu/~npramod/enc_pdf.pdf>, (Printed: Jan. 20, 2010), 7 pgs.
Murray, C, "Oracle Spatial Developer's Guide-6 Coordinate Systems (Spatial Reference Systems)", [Online]. Retrieved from the Internet<URL:http://docs.oracle.com/cd/B28359_01/appdev.111/b28400.pdf>, (Jun. 2009), 870 pgs.

(56) References Cited

OTHER PUBLICATIONS

Pozzi, F., et at, "Vegetation and Population Density in Urban and Suburban Areas in the USA", Presented at the Third International Symposium of Remote Sensing of Urban Areas; Istanbul, Turkey, Jun. 2002, (Jun. 2002), 8 pgs.

Reddy, Martin, et al., "Under the Hood of GeoVRML 1.0", Proceeding VRML '00 Proceedings of the fifth symposium on Virtual reality modeling language (Web3D-VRML), (2000), 7.

Reibel, M., et al., "Areal Interpolation of Population Counts Using Pre-classified Land Cover Data", Popul Res Policy Rev. 26, (Sep. 19, 2007), 619-633.

Reibel, M., et al., "Geographic Information Systems and Spatial Data Processing in Demography: a Review", Popul Res Policy Rev (2007) 26, (Sep. 6, 2007), 601-618.

Rizzardi, M., et al., "Interfacing U.S. Census Map Files With Statistical Graphics Software: Application and Use in Epidemiology", Statistics in Medicine, vol. 12, (1993), 1953-1964.

Snyder, John P, "Map Projections—A Working Manual", U.S. Geological Survey Professional Paper, 1395, (1987), 29 pgs.

Tangelder, J W.H, et al., "Freeform Shape Machining Using Minkowski Operations", (Jun. 1996), 12 pgs.

Thompson, Mick, "Getting Started with GEO", (Jul. 26, 2011), 3 pgs.

Turner, Andy, "Andy Turner's GISRUK 2012 Notes", Google Drive—https://docs.google.com/document/d/1cTmxg7mVx5gd89lqbICYvDEnHA4QAivH417WpyPsqE4edit?pli=1, (Sep. 16, 2013), 1-15.

Valentini, Giorgio, et al., "Ensembles of Learning Machines", Lecture Notes in Computer Science: Neural Nets, Springer Berlin Heidelberg, (Sep. 26, 2002), 3-20.

Wongsuphasawat, Krist, et al., "Visual Analytics for Transportation Incident Data Sets", Transportation Research Record: Journal of the Transportation Research Board, No. 2138, (2009), 135-145.

Woodbridge, Stephen, "Polygon Simplification", [Online]. Retrieved from the Internet<URL:http://lists.osgeo.org/pipermail/geos-devel/2011-May/005210.html>, (May 8, 2011), 2 pgs.

\* cited by examiner

300

345
RECEIVING A SELECTION OF A FIRST DATA POINT

350
CAUSING DISPLAY OF AN INTERFACE CONTROL ELEMENT IN RESPONSE TO THE SELECTION, THE INTERFACE CONTROL ELEMENT CONFIGURED TO RECEIVE A TEMPORAL CONSTRAINT

355
DEFINING A LIMIT OF THE TEMPORAL CONSTRAINT VIA THE INTERFACE CONTROL ELEMENT

360
UPDATING THE DISPLAY OF THE GEOSPATIAL DATA TO INCLUDE A SET OF DATA POINTS BASED ON THE TEMPORAL CONSTRAINT AND THE FAMILY IDENTIFIER OF THE FIRST DATA POINT

*FIG. 5*

INTERFACE TO INDEX AND DISPLAY GEOSPATIAL DATA

PRIORITY APPLICATION

This application claims priority to U.S. Provisional Application Ser. No. 62/270,510, filed Dec. 21, 2015, the disclosure of which is incorporated herein in its entirety by reference.

TECHNICAL FIELD

The subject matter disclosed herein generally relates to interfaces configured to index and display geospatial data. Specifically, example embodiments relate to a system to receive, and display geospatial vector data.

BACKGROUND

A geographic information system is a system designed to capture, store, manipulate, analyze, manage, and present geospatial data. First responders and other professionals and non-professionals in search and rescue groups often use geographic information systems to identify areas which may be affected by natural disasters, or other similar events.

An issue which frequently arises in the use of such systems is the management and display of high volumes of data, such as vector data received from multiple distinct data sources. The data is often difficult to decipher and analyze, and as a result, resources may be wasted due to a rapidly changing environment.

BRIEF DESCRIPTION OF THE DRAWINGS

Various ones of the appended drawings merely illustrate example embodiments of the present inventive subject matter and cannot be considered as limiting its scope.

FIG. 5 is a flowchart illustrating operations of the geospatial interface system in performing a method for updating a display of geospatial data within a geospatial interface, according to some example embodiments.

DETAILED DESCRIPTION

Figure 1:
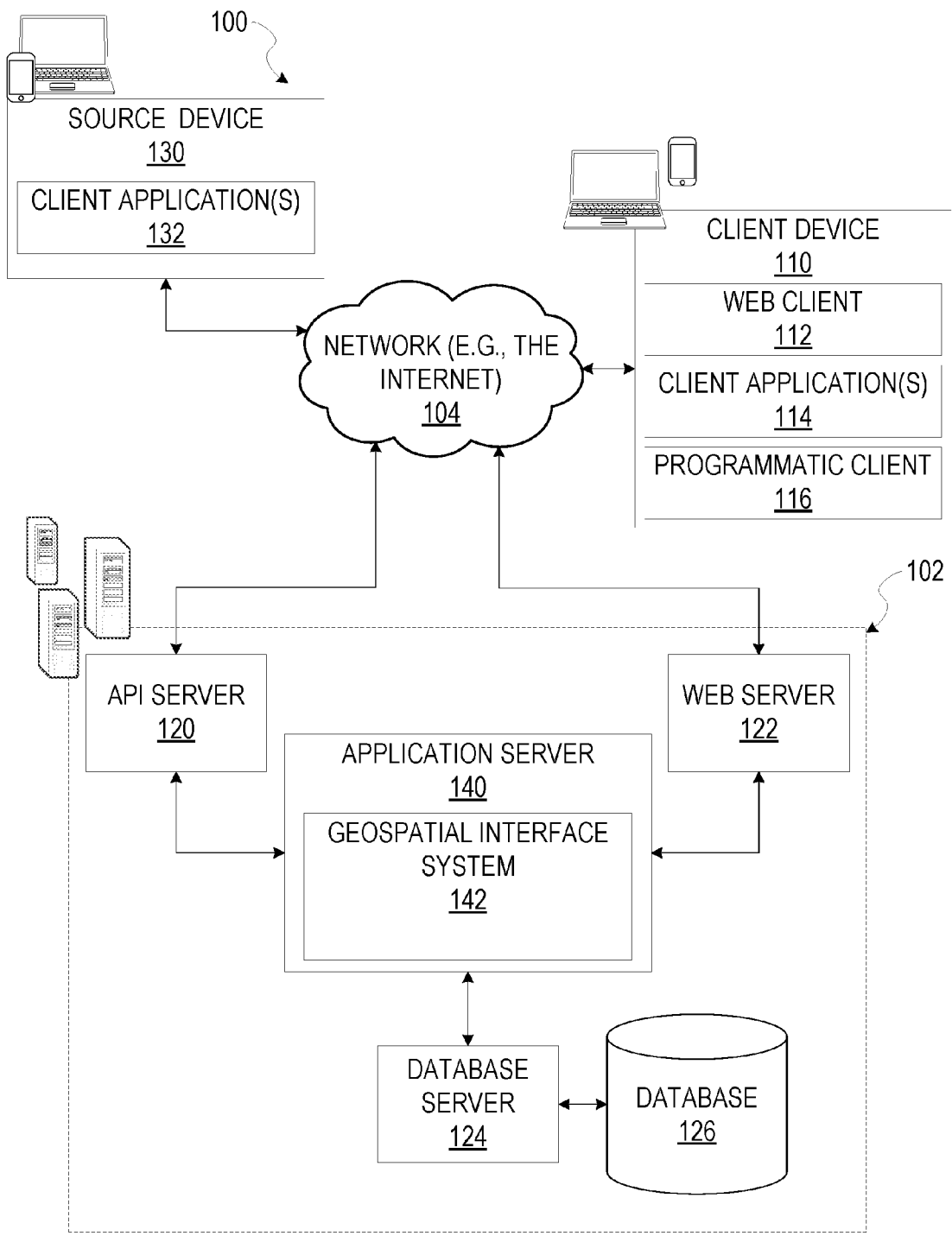
FIG. 1 is a network diagram illustrating a network environment suitable for causing display of a geospatial interface configured to receive and index geospatial data, according to some example embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Example embodiments described herein pertain to a geospatial interface system configured to cause display of geospatial data within a graphical user interface at a client device, receive data points from multiple data sources, unify the data points, and present the unified data points as interactive graphical elements within the graphical user interface, in a presentation layer separate from the geospatial data. In example embodiments, the geospatial interface system may be or include a group of one or more server machines configured to provide one or more geospatial data display, indexing, and management services. A client device may accordingly display a graphical user interface generated by the geospatial interface system.

Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The geospatial interface system is configured (e.g., by one or more suitable modules that include one or more processors) to cause display of geospatial data (e.g., map images, a base layer with a coordinate plane) within a graphical user interface at a client device, receive data points from data sources, and overlay graphical representations of the data points at locations on the base layer of the geospatial data based on metadata of the data points and a coordinate reference system of the map itself. The data points may include metadata comprising vector and temporal data, as well as identification data. In some embodiments, the data point may additionally include styling data that dictates stylistic and visual elements of the geospatial data useable to generate a raster image (rather than actually storing a raster image). Vector data comes in the form of points and lines that are geometrically and mathematically associated. The data points therefor may be stored and displayed based on a set of coordinates. For example, a two-dimensional point is stored as (x, y), while a line segment is stored as a series of point pairs, where each pair represents a straight line segment, for example, (x1, y1) and (x2, y2) indicating a line from (x1, y1) to (x2, y2). The vector data is assembled by the geospatial interface system based on the temporal data (e.g., a time series). Vector data produces smaller file size than, for example, a raster image, because a raster image needs space for all pixels while only point coordinates are stored in vector representation. The temporal data may indicate a time stamp, frequency, or interval in which the data is received.

In some example embodiments, the metadata of the data points may also include identification and text data, such as a description associated with the data point. For example, a data point may include text indicating a label for the data point (e.g., EVACUATION ZONE), or a family identifier, to describe a source of the data point (e.g., AMBULANCE-1). In further embodiments, the text data may include a description or summarization to be transmitted to the geospatial interface system. Upon receiving the data points from the data source (or sources), the geospatial interface system links the data points to other associated data points displayed within the graphical user interface. For example, data points may be associated based on having a common source, a common family identifier, or based on a user input to link two or more data points. Having linked the associated data points, the geospatial interface system updates the display.

In some example embodiments, the geospatial interface system may be further configured to facilitate searching sets of data points displayed within the graphical user interface. For example, consider an example embodiment where the geospatial data displayed within the graphical user interface comprises a map image and a base layer with a coordinate system, and the data points are overlaid at locations on the base layer based on associated vector data. To search for and identify relevant data points, a user may provide an input directly into the graphical user interface, specifying a boundary, or a point or line with a radius, to specify a search region. In response, the geospatial interface system causes display of a set of data points located within the specified region.

In further example embodiments, the user may specify search criteria, such as temporal constraints (e.g., within the last hour, day, week, month, or the last ten data points from this source) or search terms, in order to identify only those data points received within the specified span of time, frequency, or chronology. The geospatial interface system may then identify data points having temporal data within the specified time frame, or text data matching the search terms to display within the graphical user interface.

To further facilitate the ability of the geospatial interface system to index and display data points received from various data sources, the geospatial interface system may present an interface to enable a user to assign a family identifier, as well as a data retrieval interval to one or more data sources. In such embodiments, data received from a data source may then be automatically linked with other data points of the same family (e.g., based on the family identifier). Additionally, the geospatial interface system may ping the data source at intervals defined by the user input to retrieve data points.

As an illustrative example from a user perspective, suppose a user (e.g., a first responder) launches an application configured to interact with the geospatial interface system on a client device, and the geospatial interface system generates and causes display of a graphical user interface at the client device, wherein the graphical user interface includes a presentation of a map image (e.g., a region affected by a natural disaster) over a base layer with a coordinate system, with a set of graphical representations of data points received from data sources (e.g., search and rescue teams, firetrucks, ambulances) overlaid on the map image at various locations based on associated metadata. The data points may be represented as color coded points, such that each family identifier includes a corresponding color (e.g., blue indicates a particular ambulance or set of ambulances, red indicates a firetruck or set of firetrucks).

The user may select any single data point, and in response to receiving the selection, the geospatial interface system causes display of a dialogue box containing display criteria. For example, the display criteria may include temporal constraints for the associated family identifier. The user may wish to display the last ten data points received from a particular family indictor (or individual data source), or alternatively, may choose to define a range of time (e.g., from 12:00 PM to 3:00 PM). In response to receiving the temporal constraints for the family identifier, the geospatial interface system updates the graphical user interface to display only the set of data points which fit within the temporal constraint, based on associated metadata (e.g., the temporal data). In some embodiments, the geospatial interface system may also update the map image displayed to correspond to the defined temporal constraint, by including only those images which were taken during the span of time.

Alternatively, the user may define a boundary on the map image, by drawing a polygon on the map image, or placing a point or line segment, and defining a radius from the point or line segment. In response to receiving the boundary, the geospatial interface system displays all data points which exist within the enclosed region or boundary, based on their metadata. For example, the user may want information describing how many first responder had been to a particular area, and when the first responders were there. By defining a boundary enclosing the region, the user can then access the relevant data. For example, the geospatial interface system may receive and index data points pertaining to a location from a data source (e.g., GPS module), wherein the data points include vector and temporal data. At a later time, to determine when the last time data points were received from the area, the user may draw a radius around the location. In response, the geospatial interface system retrieves and buckets and presents each data point by time (e.g., based on the temporal data) in order to convey temporal elements of the data.

Now suppose the user wants to notify all personnel that a new evacuation zone has been created. The user may define a region by placing a boundary, or placing a point on the map image, and assigning text data to the point or boundary (e.g., "Evacuate to this area"). The geospatial interface system may then transmit a notification to personnel, and cause display of the point or boundary with the text data at client devices of personnel who are also accessing the geospatial interface system. In further example embodiments, the user may define specific personnel associated with data sources (e.g., an ambulance) to notify.

FIG. 1 is a network diagram illustrating a network environment 100 suitable for operating a geospatial interface system 142, according to some example embodiments. A networked system 102, provides server-side functionality, via a network 104 (e.g., an Intranet, the Internet or a Wide Area Network (WAN)), to one or more clients. FIG. 1 illustrates, for example, a web client 112 (e.g. a web browser), client application(s) 114, and a programmatic client 116 executing on respective client device 110. It shall be appreciated that although the various functional components of the system 100 are discussed in the singular sense, multiple instances of one or more of the various functional components may be employed.

An Application Program Interface (API) server 120 and a web server 122 are coupled to, and provide programmatic and web interfaces respectively to, one or more application server 140. The application server(s) 140 host the geospatial interface system 142. The application servers 140 are, in turn, shown to be coupled to one or more database servers 124 that facilitate access to one or more databases 126.

The geospatial interface system 142 is a server application with a web front-end that causes display of geospatial data, including for example map images and a base layer with a coordinate system, within a graphical user interface at a client device 110. The geospatial interface system 142 receives and indexes data points received from data sources, and displays graphical representations of the data points within the graphical user interface. For example, the geospatial information system 142 may be configured to receive data points, determine a location on a base layer to overlay a graphical representation of the data point, and cause display of the graphical representation at the client device 110. While the geospatial interface system 142 is shown in FIG. 1 to form part of the networked system 102, it will be appreciated that, in alternative embodiments, the geospatial interface system 142 may form part of a system that is separate and distinct from the networked system 102.

FIG. 1 also illustrates a client application 132, executing on a source device 130, as having programmatic access to the networked system 102 via the programmatic interface provided by the API server 120. The source device 130 may, for example, be a source of geospatial data useable by the geospatial interface system 142.

Figure 2:
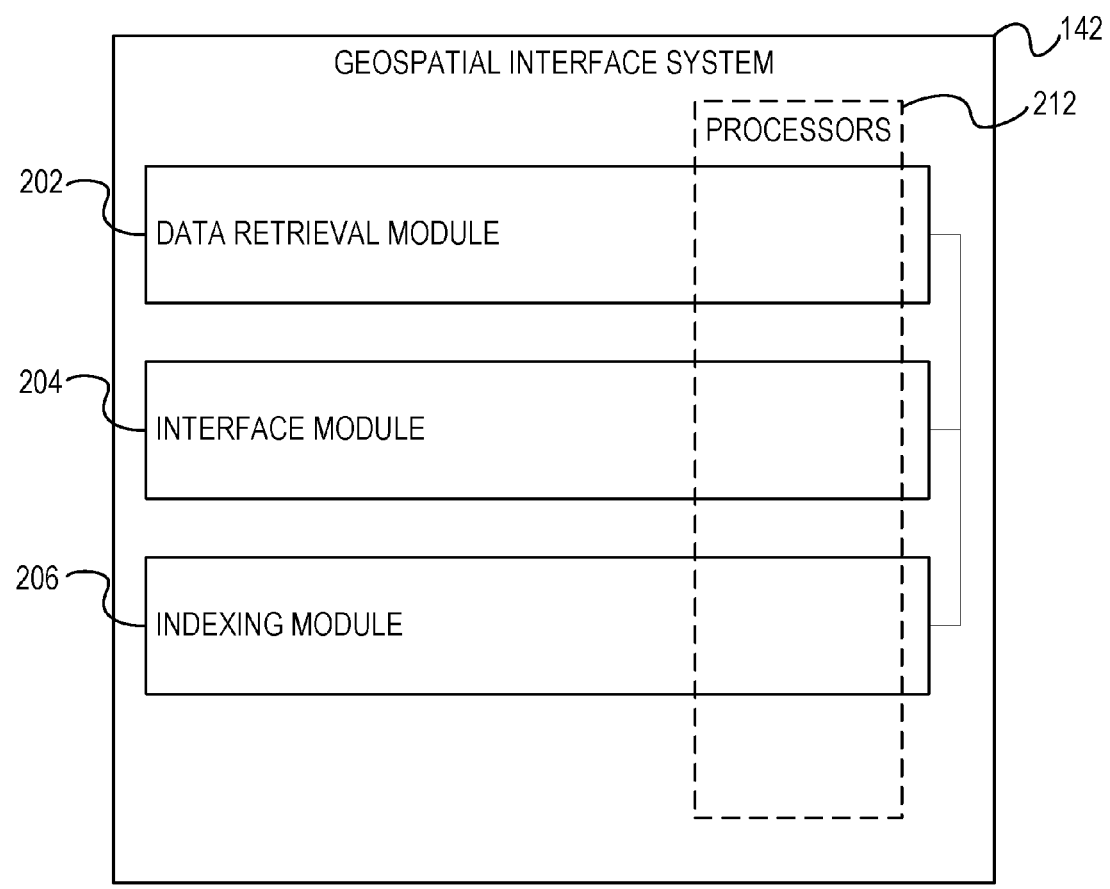
FIG. 2 is a block diagram illustrating components of a geospatial interface system suitable to receive and index geospatial data, according to some example embodiments.

FIG. 2 is a block diagram illustrating components of a geospatial interface system 142 suitable to generate and cause display of geospatial data within a graphical user interface, receive data points from multiple data sources, index and unify the data points by linking them with associated data points within the geospatial interface system 142, and cause display of graphical representations of the data points within the graphical user interface, according to some example embodiments. As is understood by skilled artisans in the relevant computer and Internet-related arts, each component (e.g., a module or engine) illustrated in FIG. 2 represents a set of executable software instructions and the corresponding hardware (e.g., memory and processor) for executing the instructions. The geospatial interface system 142 is shown as including a data retrieval module 202, an interface 204, and an indexing module 206, each of which is configured and communicatively coupled to communicate with the other modules (e.g., via a bus, shared memory, or a switch).

Data points are obtained via the data retrieval module 202, from one or more data sources (e.g., the source device 130 or the client device 110). In such instances, the data retrieval module 202 may receive a request to retrieve geospatial data from the source device 130, or from the client device 110. For example, a user at the client device 110 may define a data retrieval interval in the geospatial interface system 142 in which to receive data from the source device 130. The data retrieval interval may include a frequency, and an identifier of the source device 130. Responsive to receiving the data retrieval interval, the data retrieval module 202 retrieves data points from the source device 130. In further example embodiments, the data retrieval module 220 may request data points from the source source device 130 based on individual data retrieval requests received from the user at the client device 110.

The data retrieval module 202 provides the data points to the indexing module 206. The indexing module 206 is configured to identify and index the data point, based on metadata associated with the data point. For example, the indexing module 206 may assign all data points received from a particular data source (e.g., source device 130) to a particular family identifier.

After indexing the data points, the data retrieval module 202 provides the indexed data points to the interface module 204. The interface module 204 is configured to overlay a graphical representation of the data point at a location on the geospatial data within the graphical user interface. The interface module 204 may extract vector data, temporal data, and text data from the data point in order to generate and place the graphical representation.

Any one or more of the modules described may be implemented using hardware alone (e.g., one or more of the processors 212 of a machine) or a combination of hardware and software. For example, any module described of the geospatial interface system 142 may physically include an arrangement of one or more of the processors 212 (e.g., a subset of or among the one or more processors 212 of the machine) configured to perform the operations described herein for that module. As another example, any module of the geospatial interface system 142 may include software, hardware, or both, that configures an arrangement of one or more processors 212 (e.g., among the one or more processors 212 of the machine) to perform the operations described herein for that module. Accordingly, different modules of the geospatial interface system 142 may include and configure different arrangements of such processors 212 or a single arrangement of such processors 212 at different points in time. Moreover, any two or more modules of the geospatial interface system 142 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
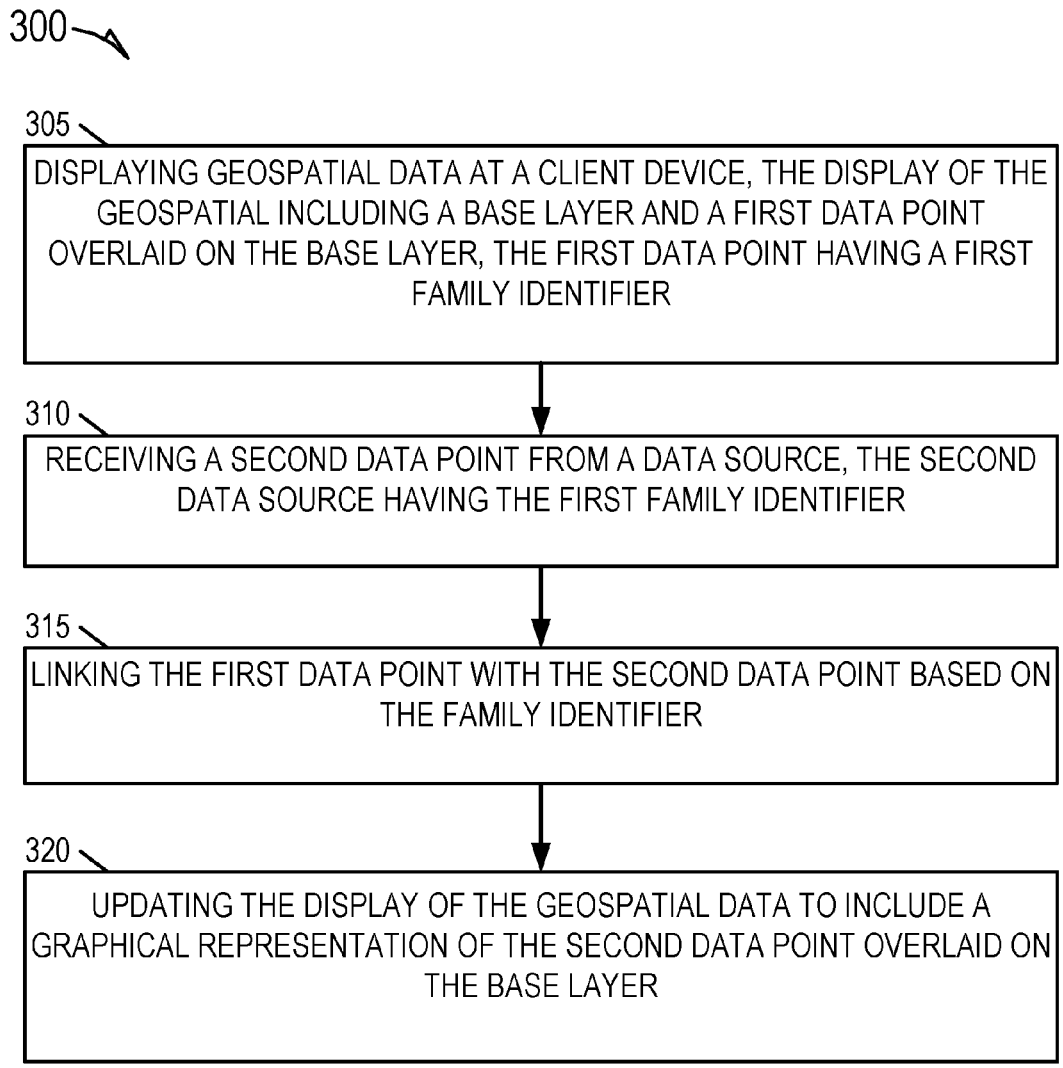
FIG. 3 is a flowchart illustrating operations of the geospatial interface system in performing a method for updating a display of geospatial data within a geospatial interface, according to some example embodiments.

FIG. 3 is a flowchart illustrating operations of the geospatial interface system 142 in performing a method 300 of indexing and causing display of a data point, according to some example embodiments. The method 300 may be embodied in computer-readable instructions for execution by one or more processors such that the steps of the method 300 may be performed in part or in whole by the components of the geospatial interface system 142; accordingly, the method 300 is described below by way of example with reference thereto. However, it shall be appreciated that the method 300 may be deployed on various other hardware configurations and is not intended to be limited to the geospatial interface system 142.

At operation 305, the interface module 204 causes display of geospatial data within a graphical user interface at a client device. The geospatial data may include, for example, a set of map images, a base layer with an associated coordinate plane, and a graphical representation of a first data point received from a data source (e.g., source device 130). In some embodiments, the graphical representation of the data point may be color coded based on an associated family identifier.

At operation 310, the data retrieval module 202 receives a second data point from a data source (e.g., source device 130). The second data point may include associated metadata, including, for example, vector data defining coordinates of the data point with respect to the base layer, temporal data, and text data including, for example, an identifier of the data source, as well as notes and other text.

Upon receiving the second data point via the data retrieval module 202, the index module 206 extracts the metadata of the second data point to determine a location to overlay a graphical representation of the second data point on the base layer, and to identify an appropriate family identifier to assign to the second data point (e.g., based on the identifier of the data source). At operation 315, the index module 206 links the first data point with the second data point based on the family identifier, and at operation 320, the interface module 204 updates the display of the geospatial data to include a graphical representation of the second data point overlaid on the base layer.

Figure 4:
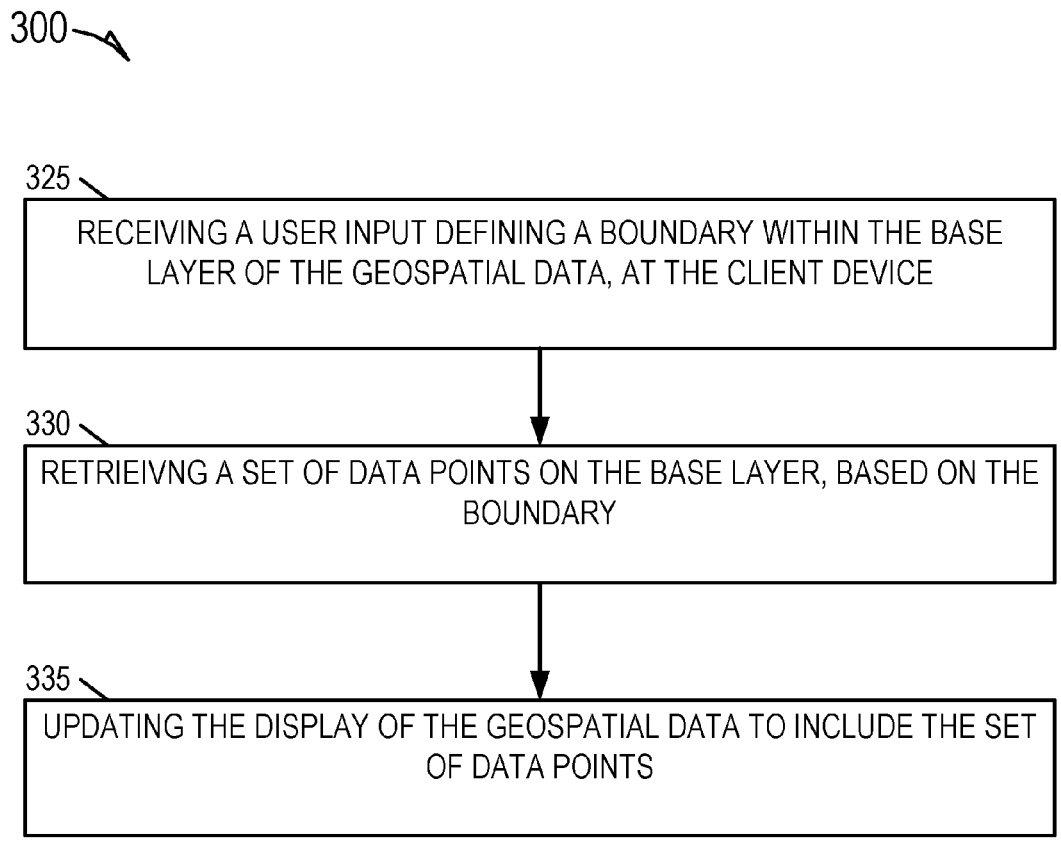
FIG. 4 is a flowchart illustrating operations of the geospatial interface system in performing a method for updating a display of geospatial data within a geospatial interface, according to some example embodiments.

As shown in FIG. 4, one or more operations 325, 330, and 335 may be performed as part (e.g., a precursor task, a subroutine, or portion) of method 300, according to some example embodiments. The method 300 as shown in FIG. 4 illustrates a method for defining a boundary to retrieve a set of data points.

Operation 325 may be performed by the interface module 204. The interface module 204 may receive a user input defining a boundary within the base layer of the geospatial data. For example, a user may draw a radius or polygon over the base layer in order to define a boundary. In response, at operation 330, the interface module 204 identifies a set of data points located within the defined boundary.

In some embodiments, the user may simply select a point, or draw a line segment, and define a distance from the point or line segment in which to set a boundary. In further example embodiments, the user may provide additional search criteria, such as a family identifier. In response, the interface module 204 identifies and presents a set of data points based on the boundary and search criteria.

At operation 335, having identified the set of data points within the boundary, the interface module 204 causes display of the set of interface elements at locations overlaid on top of the base layer at the client device. In some example embodiments, the interface module 204 also causes display of a dialogue box including additional details about the identified set of data points. For example, the dialogue box may include an indication of a total number of data points which have been received from the defined region, from other data sources or family identifiers, as well as a total amount of time spent in the defined region.

As show in FIG. 5, one or more operations 345, 350, 355, and 360 may be performed as a part (e.g., a precursor task, a subroutine, or portion) of the method 300, according to some example embodiments. The method 300 illustrated in FIG. 5 depicts operations to define a temporal constraint, and displaying a set of data points based on the temporal constraint.

Operation 345 may be performed by the interface module 204. At operation 345, the interface module 204 receives a selection of a first data point overlaid on the base layer of the geospatial data at the client device 110. For example, a user at client device 110 may select the first data point via a cursor element, or by a tactile input to the graphical user interface.

In response to receiving the selection of the data point, at operation 350, the interface module 204 causes display of an interface control element configured to receive a temporal constraint (e.g., a dialogue box) within the graphical user interface. In some example embodiments, the interface control element may have a set of one or more search fields in addition to the temporal constraint to provide search criteria, such as text data, family identifiers, and so on. The temporal constraint may be displayed as a drop down menu, or a text field, wherein a user may define the temporal constraints. Temporal constraints may include a period of time (e.g., a range), a specific date or time (e.g., a point in time), a chronology (e.g., the last ten data points received), as well as an interval (e.g., data points received within a minute before or after a time). At operation 355, the interface module 204 receives a limit of the temporal constraint via the interface control element.

Having defined a limit to the temporal constraint, at operation 360 the interface module 204 updates the display of the geospatial data to include a set of data points based on the temporal constraints and the family identifier of the first data point selected. To identify the set of data points, the interface module 204 may provide the temporal constraints to the indexing module 206 which then searches the temporal data of the data points associated with the family identifier. Upon identifying the set of data points which fit with the temporal constraints, the interface module 204 updates the display to include only those data points identified.

Figure 6:
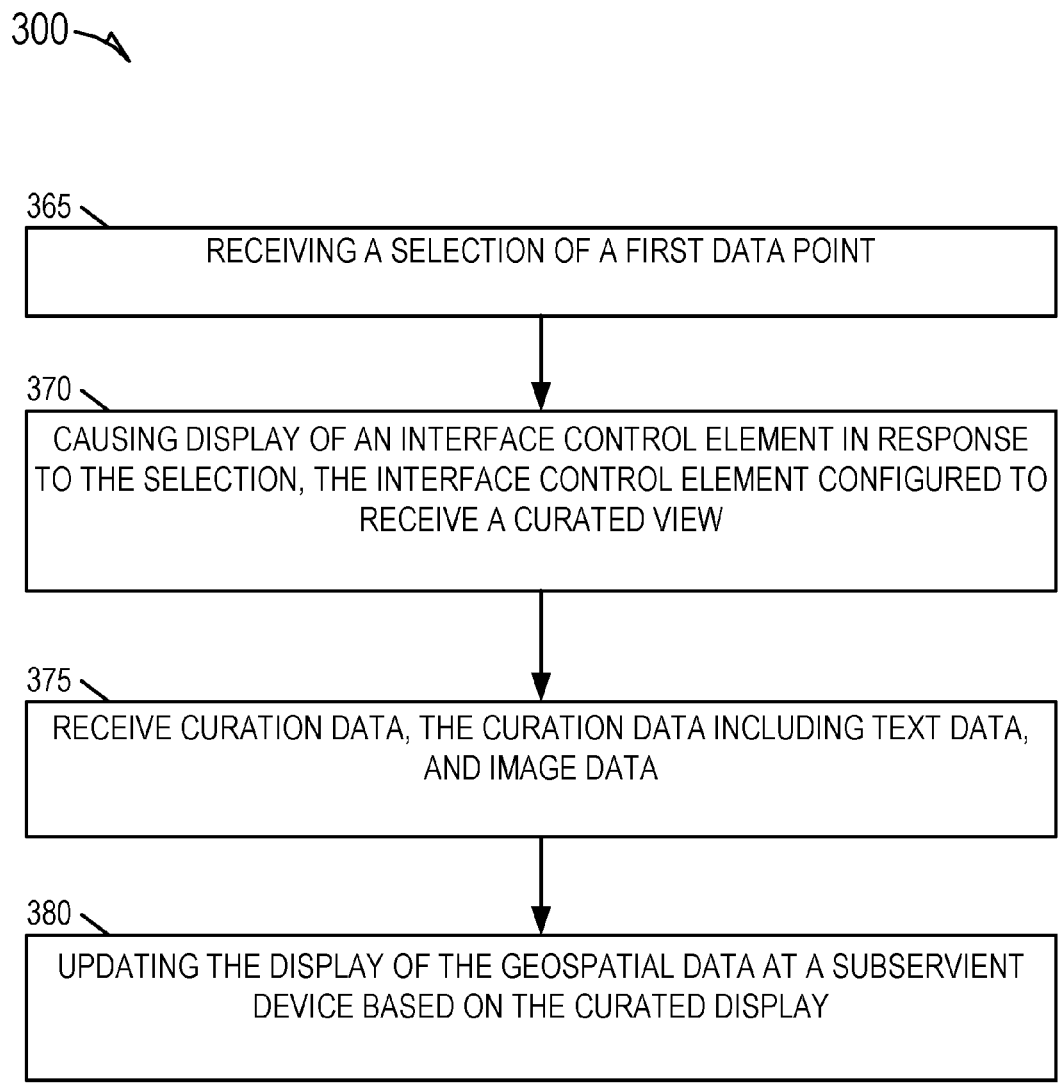
FIG. 6 is a flowchart illustrating operations of the geospatial interface system in performing a method for updating a display of geospatial data within a geospatial interface, according to some example embodiments.

In some example embodiments, the geospatial interface system 142 also enables a user at client device 110 to generate a curated display, and present the curated display to a subservient device or set of devices, including for example, the source device 130, as well as a main display linked to the client device 110 (e.g., a separate presentation screen). As show in FIG. 6, one or more operations 365, 370, 375, and 380 may be performed as a part (e.g., a precursor task, a subroutine, or portion) of the method 300, according to some example embodiments. The method 300 illustrated in FIG. 6 depicts the operations to generate and present a curated view.

Operation 365 may be performed by the interface module 204. The interface module 204 receives a selection of a first data point from client device 110. In some example embodiments, the selection may include a set of data points, or a selection of a boundary region. In response to receiving the selection, at operation 370, the interface module 204 causes display of an interface control element configured to receive a curated display. The interface control element may include one or more interface elements to receive curation data, such as a drop down menu, text box, image upload field, as well as a priority indicator.

At operation 375, the interface control module 204 receives curation data via the interface control element. The curation data may include, for example, text and image data. For example, a user may upload one or more images to display at the subservient devices, as well as text associated with each image, or with the set of images. At operation 380, in response to receiving the curation data, the interface control module updates the display of the geospatial data to include the curated view. For example, the interface module 204 may display the curated view at a set of subservient devices (e.g., client device 130), or at a separate presentation screen.

Figure 7:
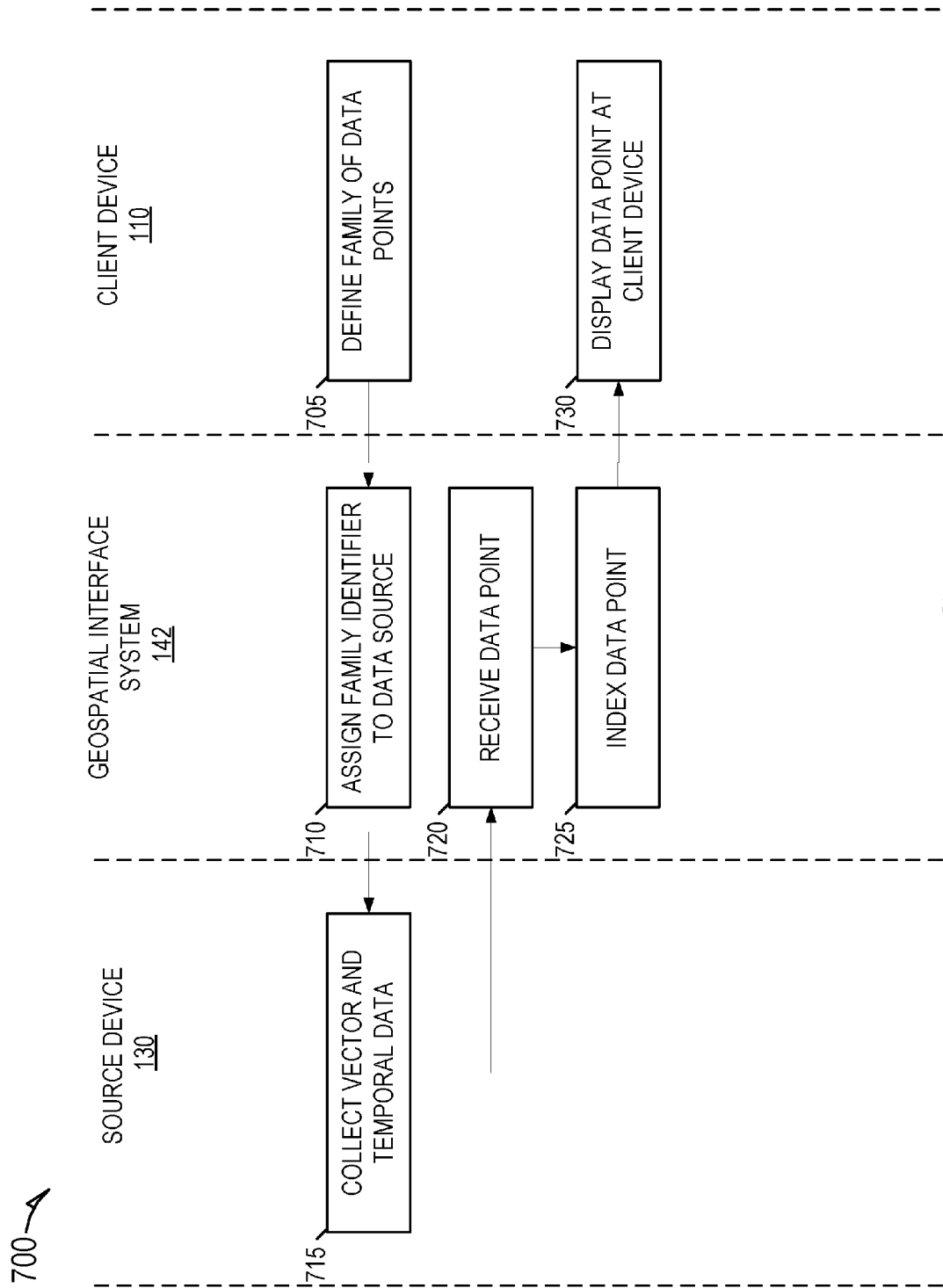
FIG. 7 is an interaction diagram illustrating various example interactions between the geospatial interface system, a source device, and a client device, according to some example embodiments.

FIG. 7 is an interaction diagram depicting example exchanges between the geospatial interface system 142, source device 130, and client device 110, consistent with some example embodiments. At operation 705, the client device 705 receives an input into a graphical user interface generated by the geospatial interface system 142, to define a family of data point. The definition of the family of data points may include one or more data sources (e.g., source device 130), and a family identifier. In some example embodiments, the family definition may also include a frequency, or data retrieval interval to assign to the data sources. The data retrieval interval specifies a rate at which data points are retrieved from the data source.

At operation 710, the geospatial interface system 142 receives the definition of the family, and assigns the family identifier to the one or more data sources identified. By doing so, data points received from the one or more data sources are indexed by the geospatial interface system 142 based on the family identifier. At operation 715, the data source (e.g., source device 130) collects vector data and temporal data to be transmitted to the geospatial interface system 142.

At operations 720, the geospatial interface system 142 receives a data point from the source device 130, based on the defined interval. The data point comprises the temporal data and the vector data, such that the vector data defines coordinates of the data point, and the temporal data defines a time series associated with the data point. In some example embodiments, the data point may also include image and text data. Upon receiving the data at the geospatial interface system 142, at operation 725, the index module 206 indexes and unifies the data by linking it with other associated data points. Data points may be associated based on sharing a common family identifier, or in some example embodiments may be linked based on user input. In further embodiments, a user may specify temporal or vector data attributes to link data points based on. For example, a user may specify that all data points received in a window of time are linked.

A user accessing the GIS 142 on a client device 110 is presented with the GIS interface 700, including the imagery search field 710. The user may provide the imagery search field 710 with search criteria (e.g., a file name, file source) in order to retrieve one or more images and data to be uploaded into the GIS 142, and to generate an present a tile cache based on the uploaded image (e.g., geospatial data 702).

Figure 8:
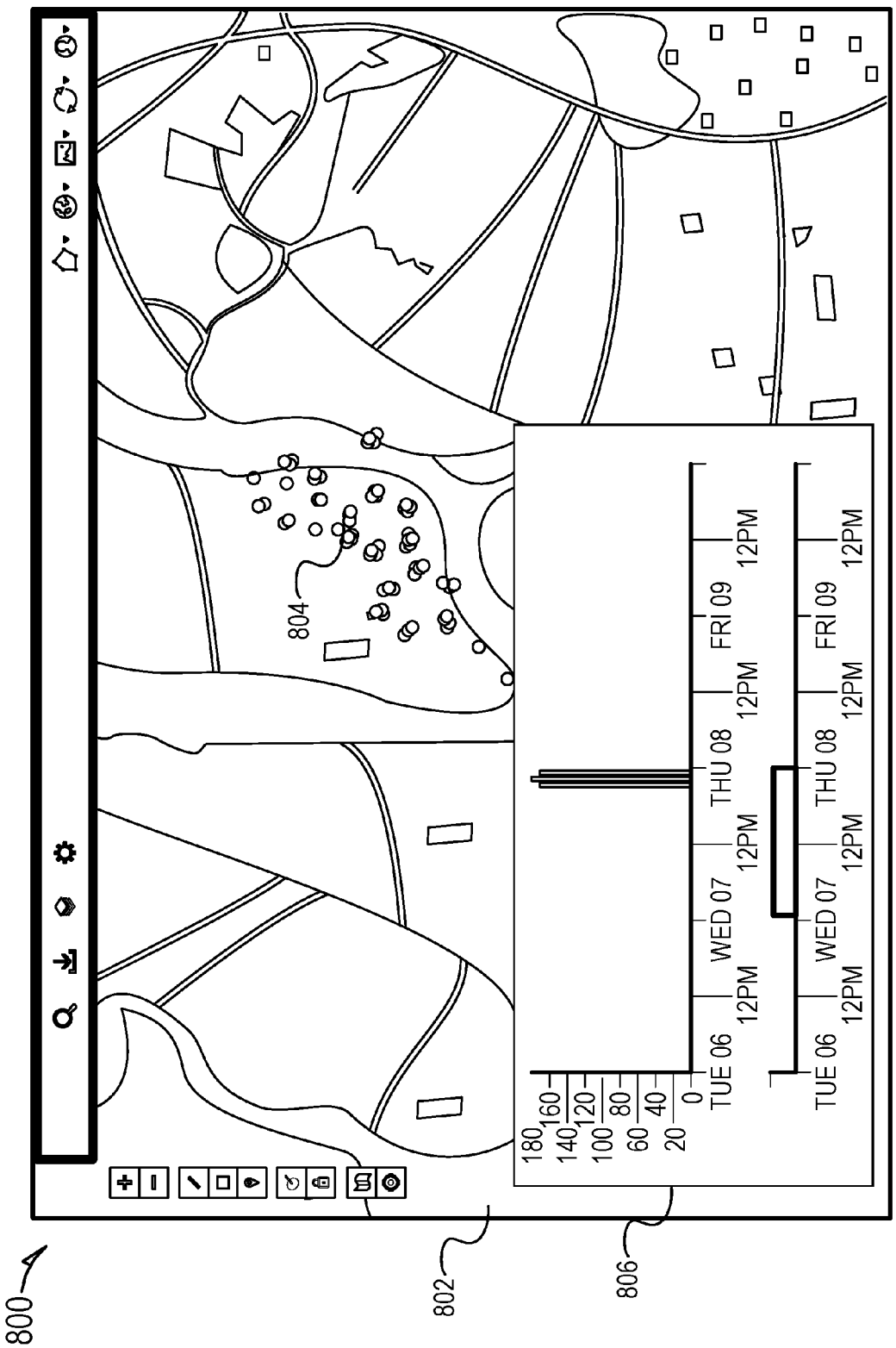
FIG. 8 is a diagram illustrating a geospatial interface configured to present geospatial data, according to some example embodiments.

FIG. 8 depicts an exemplary graphical user interface 800 generated by the geospatial interface system 142, configured to display geospatial data including a map image 802, a base layer, and one or more data points 804 received from various data sources. In an example embodiment, data points are received from various data sources (e.g., source device 130) at the geospatial interface system 142, indexed based on metadata associated with the data points (e.g., vector data, temporal data), and displayed within the graphical user interface 800 at a client device 110. In further example embodiments, the display may include a graph element 806 configured to display a time series of the data points.

Figure 9:
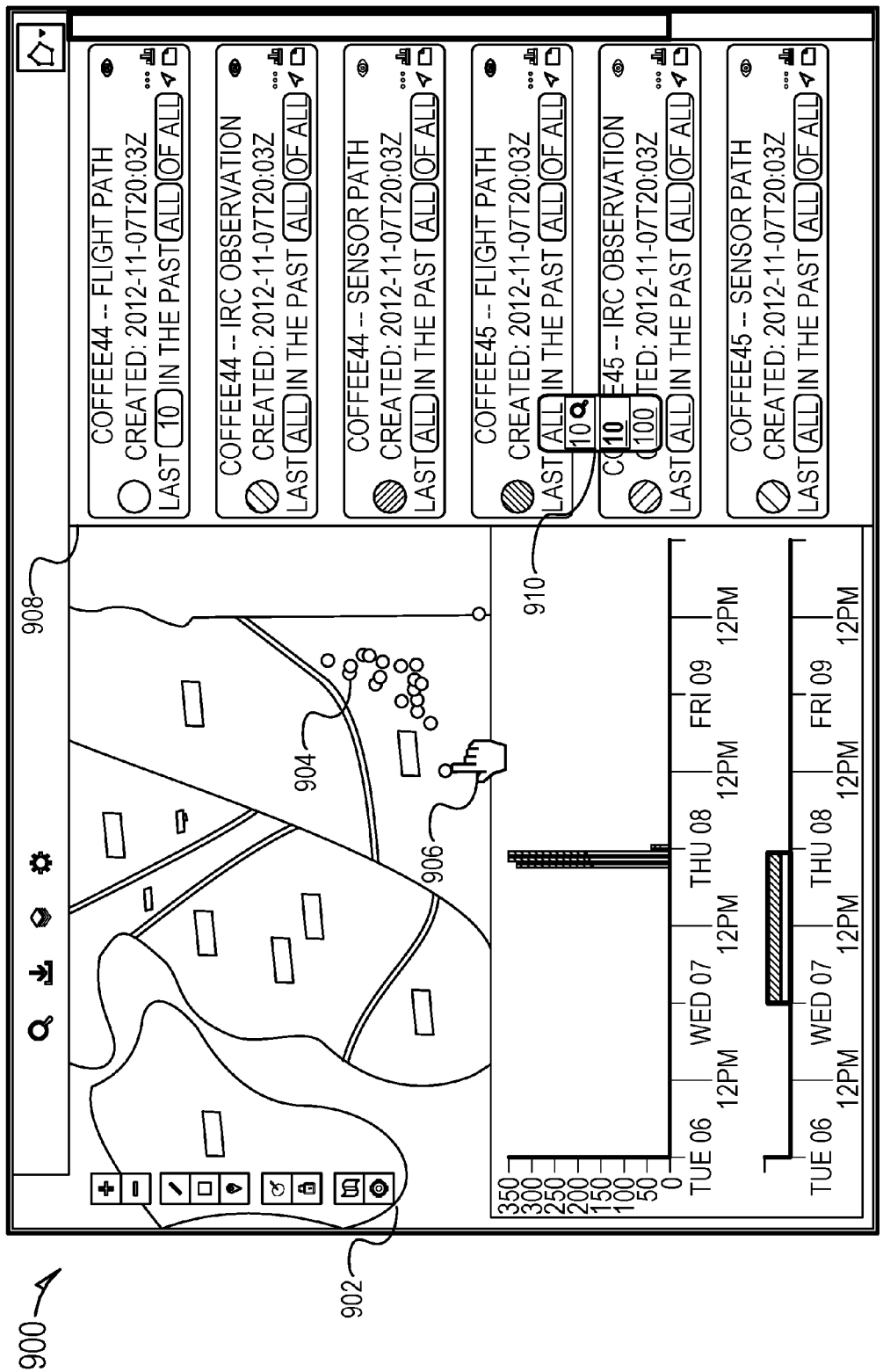
FIG. 9 is a diagram illustrating a geospatial interface configured to present geospatial data, according to some example embodiments.

FIG. 9 depicts an exemplary graphical user interface 900 generated by the geospatial interface system 142, configured to display geospatial data including a map image 902, a base layer, and one or more data points 904 received from various data sources. In an example embodiment, a user of client device 110 may select a data point (e.g., via a cursor element 906), and in response, the geospatial interface system 142 causes display of an interface control element 908 configured to receive temporal constraints (e.g., temporal constraints 910). The user may provide temporal constraints via the interface control element, and in response, the geospatial interface system 142 may update the display of the graphical user interface 900 to include the set of data points 904 based on the temporal constraints specified (e.g., based on the temporal data of the data points). For example, a user may specify a range, or time period, and in response, the geospatial interface system 142 may update the display to include only a set of data points which includes temporal data within the defined range. In further example embodiments, the user may specify a chronology (e.g., the last ten data points), and in response the geospatial interface system 142 updates to display only the last ten data points received.

Figure 10:
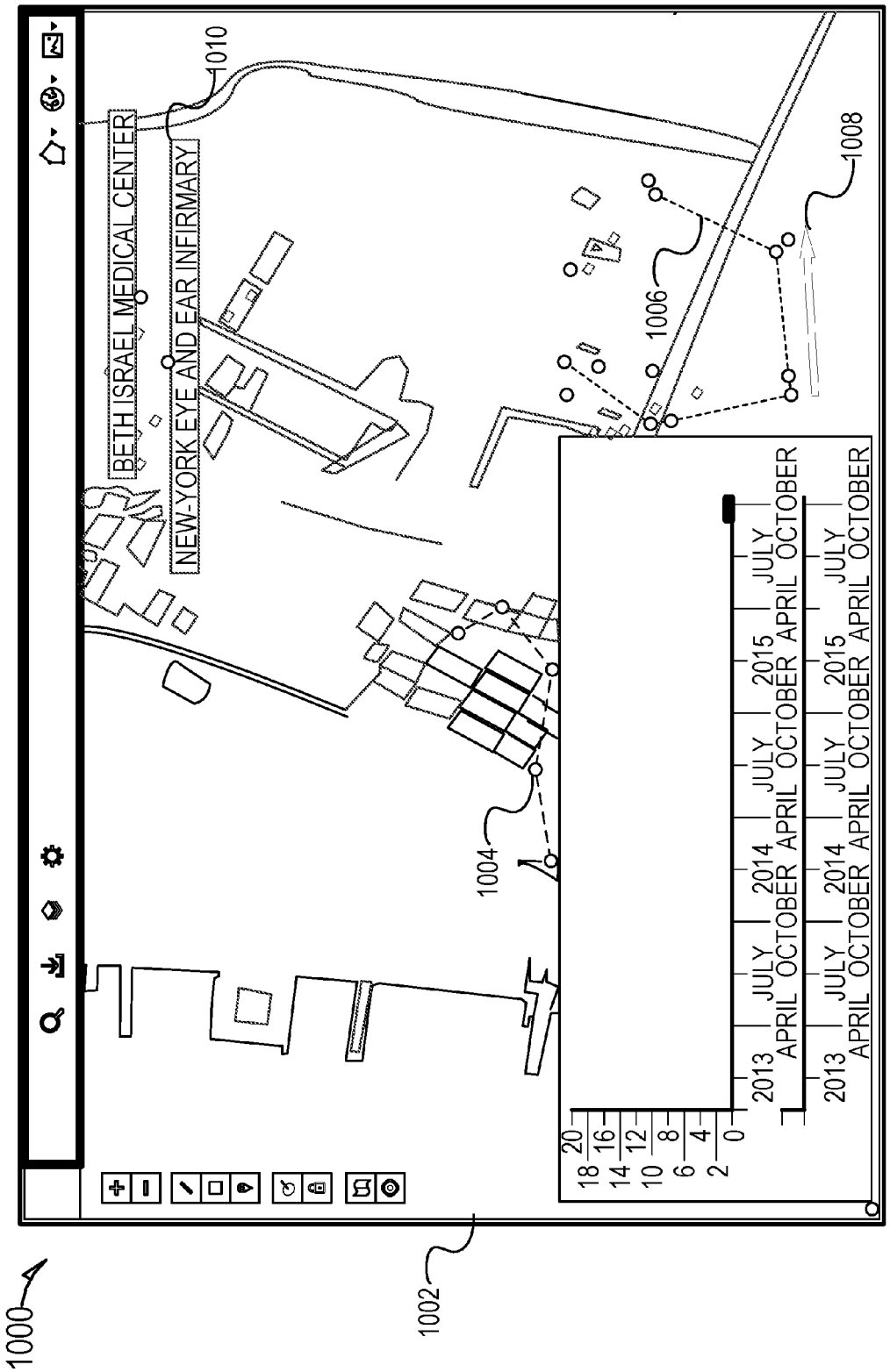
FIG. 10 is a diagram illustrating a geospatial interface configured to present geospatial data, according to some example embodiments.

FIG. 10 depicts an exemplary graphical user interface 1000 generated by the geospatial interface system 142, configured to display geospatial data including a map image 1002, a base layer, and one or more data points (e.g., data point 1004) received from various data sources. In some example embodiments, the geospatial interface system 142 displays data point labels (e.g., data point label 1010) for each data point. In an example embodiment, the geospatial interface system 142 may display associated data points (e.g., linked data points, data points with common family identifier) by connecting the associated data points with line segments (e.g., line segment 1006). In further example embodiments, the line segments may include an indicator 1008 of a direction of movement.

Figure 11:
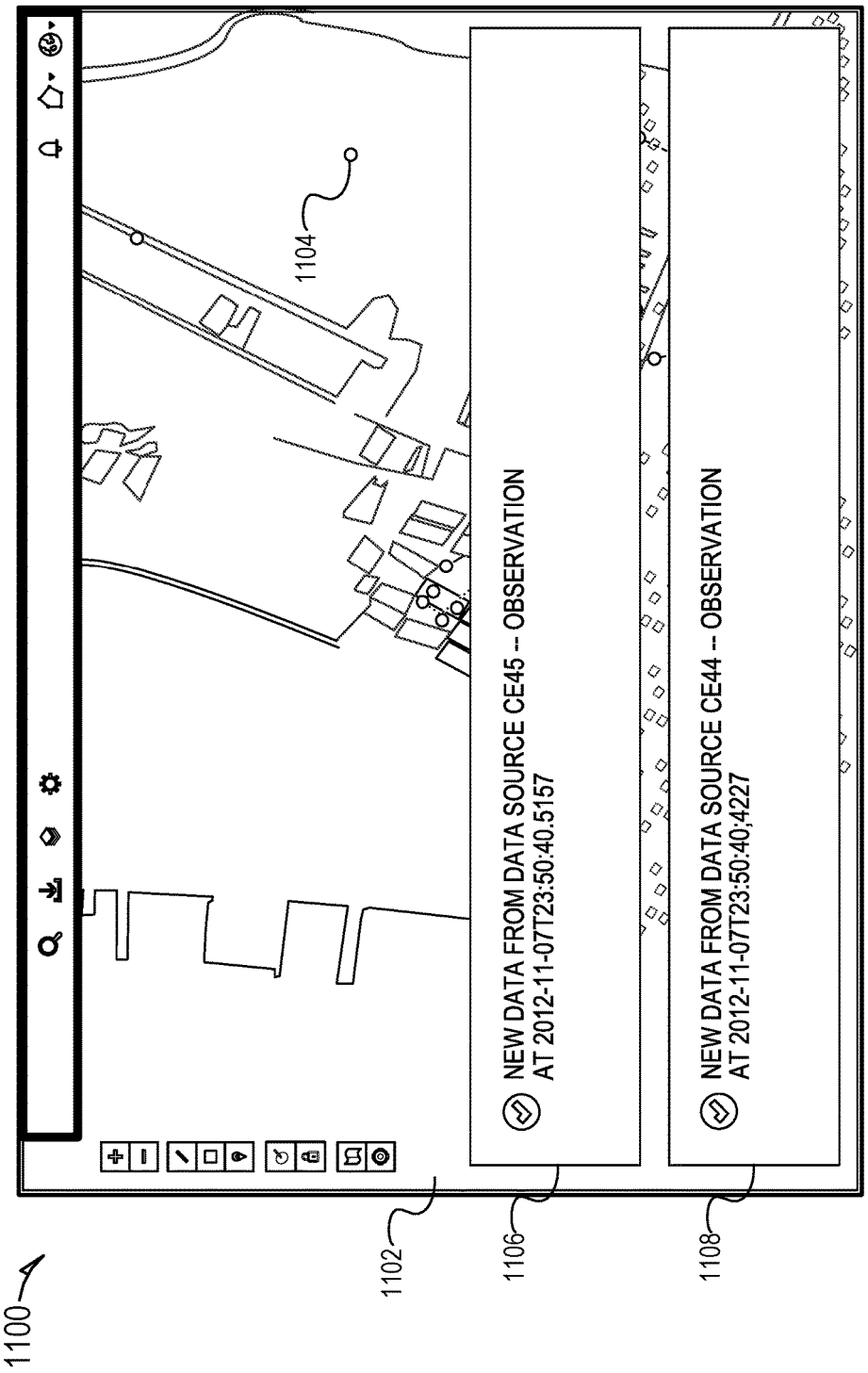
FIG. 11 is a diagram illustrating a geospatial interface configured to present geospatial data, according to some example embodiments.

FIG. 11 depicts an exemplary graphical user interface 1100 generated by the geospatial interface system 142, configured to display geospatial data including a map image 1102, a base layer, and one or more data points (e.g., data point 1104) received from various data sources. In an example embodiment, the geospatial interface system 142 presents a notification (e.g., notification 1106, notification 1108) at the client device 110 in response to receiving a data point from a data source. For example, the geospatial interface system 142 may receive a notification request from the client device 110, wherein the notification request includes an indication of an event, and a notification distribution. In response, upon detecting the occurrence of the event (e.g., a data source transmits a data point), the geospatial interface system 142 causes display of notifications 1106 at the client device 110, as well as a set of additional client devices defined by the notification distribution. For example, the user may configure the notification to be distributed to a specific set of devices.

Figure 12:
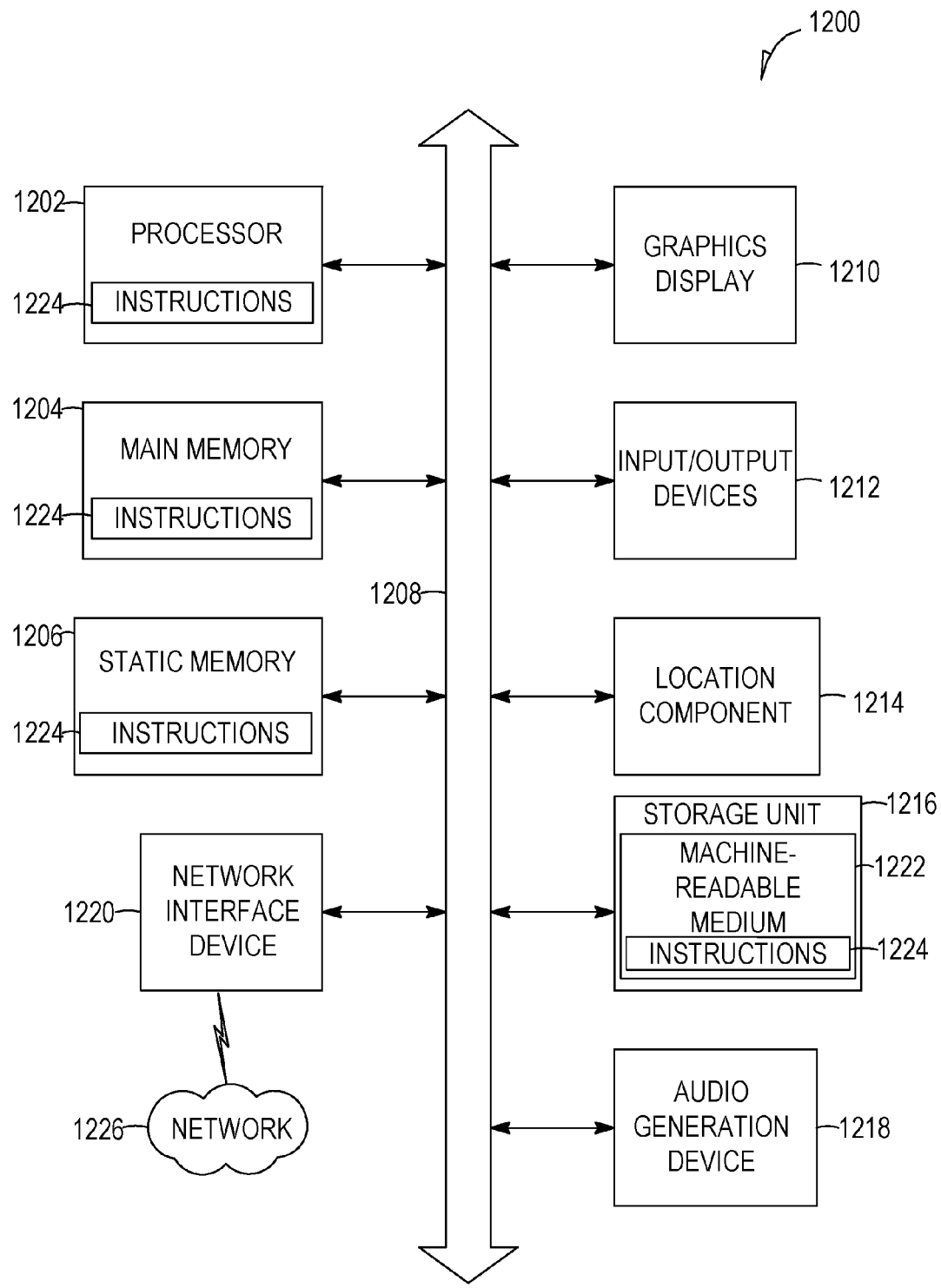
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions 1224 from a machine-readable medium 1222 (e.g., a non-transitory machine-readable medium, a machine-readable storage medium, a computer-readable storage medium, or any suitable combination thereof) and perform any one or more of the methodologies discussed herein, in whole or in part. Specifically, FIG. 12 shows the machine 1200 in the example form of a computer system (e.g., a computer) within which the instructions 1224 (e.g., software, a program, an application, an applet, an app, or other executable code) for causing the machine 1200 to perform any one or more of the methodologies discussed herein may be executed, in whole or in part.

In alternative embodiments, the machine 1200 operates as a standalone device or may be communicatively coupled (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a PC, a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include any collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The processor 1202 may contain solid-state digital microcircuits (e.g., electronic, optical, or both) that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein. In some example embodiments, the processor 1202 is a multicore CPU (e.g., a dual-core CPU, a quad-core CPU, or a 128-core CPU) within which each of multiple cores is a separate processor that is able to perform any one or more of the methodologies discussed herein, in whole or in part. Although the beneficial effects described herein may be provided by the machine 1200 with at least the processor 1202, these same effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1200 may further include a graphics display 1210 (e.g., a plasma display panel (PDP), a light emitting diode (LED) display, a liquid crystal display (LCD), a projector, a cathode ray tube (CRT), or any other display capable of displaying graphics or video). The machine 1200 may also include an input/output device 1212 (e.g., a keyboard or keypad, a mouse, or a trackpad), a storage unit 1216, an audio generation device 1218 (e.g., a sound card, an amplifier, a speaker, a headphone jack, or any suitable combination thereof), and a network interface device 1220.

The storage unit 1216 includes the machine-readable medium 1222 (e.g., a tangible and non-transitory machine-readable storage medium) on which are stored the instructions 1224 embodying any one or more of the methodologies or functions described herein. The instructions 1224 may also reside, completely or at least partially, within the main memory 1204, within the processor 1202 (e.g., within the processor's cache memory), within the static memory 1206, or all three, before or during execution thereof by the machine 1200. Accordingly, the main memory 1204 and the processor 1202 may be considered machine-readable media (e.g., tangible and non-transitory machine-readable media). The instructions 1224 may be transmitted or received over a network 1226 via the network interface device 1220. For example, the network interface device 1220 may communicate the instructions 1224 using any one or more transfer protocols (e.g., hypertext transfer protocol (HTTP)).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store the instructions 1224. The term "machine-readable medium" shall also be taken to include any medium, or combination of multiple media, that is capable of storing the instructions 1224 for execution by the machine 1200, such that the instructions 1224, when executed by one or more processors of the machine 1200 (e.g., processor 1202), cause the machine 1200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1224 for execution by the machine 1200 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1224).

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
one or more processors; and
a memory storing instructions that, when executed by at least one processor among the one or more processors, causes the system to perform operations comprising:
causing a display of geospatial data at a client device, the display of the geospatial data including a base layer and a first graphical representation of a first data point overlaid on the base layer at a first location, the first graphical representation of the first data point comprising first vector data that identifies the first location on the base layer, and a family identifier that identifies a family definition, the family definition including a data retrieval interval;
receiving an input that assigns the family identifier of the first vector data to a first data source;
retrieving a second data point from the first data source based on the data retrieval interval, in response to the input that assigns the family identifiers to the first data source, the second data point including second vector data; and updating the display of the geospatial data to include a second graphical representation of the second data point overlaid on the base layer at a second location, the second location based on the second vector data.

2. The system of claim 1, wherein the instructions cause the system to perform operations further comprising:
receiving a user input defining a boundary within the base layer;
retrieving a set of data points on the base layer based on the boundary; and
causing display of graphical representations of the set of data points on the base layer.

3. The system of claim 1, wherein the geospatial data includes a set of data points, the set of data points including the family identifier of the first data point, the first data point and the set of data points including temporal data, and the instructions cause the system to perform operations further comprising:
receiving a selection of the first data point;
causing display of an interface control element in response to the selection, the interface control element configured to receive a temporal constraint;
defining a limit of the temporal constraint via the interface control element; and
updating the display of the geospatial data to include a portion of the set of data points based on the temporal constraint and the family identifier of the first data point.

4. The system of claim 3, wherein the temporal constraint is selected from the group comprising a date, a time, a chronology, and a frequency.

5. The system of claim 1, wherein the instructions cause the system to perform operations further comprising:
receiving a selection of a data source;
assigning the family identifier to the data source;
defining a data update interval for the data source;
requesting, at the data update interval, temporal data and vector data from the data source; and
causing display of a graphical representation of a subsequent data point based on the temporal and vector data from the data source.

6. The system of claim 5, wherein the instructions cause the system to perform operations further comprising:
causing display of a notification in response to receiving the subsequent data point, the notification including the data source identifier.

7. The system of claim 1, wherein the instructions cause the system to perform operations further comprising:
receiving a third data point, the third data point including third vector data, the family identifier, and image data of an image;
causing display of the third data point on the base layer based on the third vector data;
receiving a selection of the third data point; and
causing display of the image based on the image data.

8. The system of claim 1, wherein the geospatial data includes a map image and a coordinate system.

9. A method comprising:
causing a display of geospatial data at a client device, the display of the geospatial data including a base layer and a first graphical representation of a first data point overlaid on the base layer at a first location, the first graphical representation of the first data point comprising first vector data that identifies the first location on the base layer, and a family identifier that identifies a family definition, the family definition including a data retrieval interval;
receiving a user input that assigns the family identifier of the first vector data to a first data source;
retrieving a second data point from the first data source based on the data retrieval interval, in response to the user input that assigns the family identifiers to the first data source, the second data point including second vector data; and
updating the display of the geospatial data to include a second graphical representation of the second data point overlaid on the base layer at a second location, the second location based on the second vector data.

10. The method of claim 9, wherein the method further comprises:
receiving a user input defining a boundary within the base layer;
retrieving a set of data points on the base layer based on the boundary; and
causing display of graphical representations of the set of data points on the base layer.

11. The method of claim 9, wherein the geospatial data includes a set of data points, the set of data points including the family identifier of the first data point, the first data point and the set of data points including temporal data, and the method further comprises:
receiving a selection of the first data point;
causing display of an interface control element in response to the selection, the interface control element configured to receive a temporal constraint;
defining a limit of the temporal constraint via the interface control element; and
updating the display of the geospatial data to include a portion of the set of data points based on the temporal constraint and the family identifier of the first data point.

12. The method of claim 11, wherein the temporal constraint is selected from the group comprising a date, a time, a chronology, and a frequency.

13. The method of claim 9, wherein the method further comprises:
receiving a selection of a data source;
assigning the family identifier to the data source;
defining a data update interval for the data source;
requesting, at the data update interval, temporal data and vector data from the data source; and
causing display of a graphical representation of a subsequent data point based on the temporal and vector data from the data source.

14. The method of claim 13, wherein the method further comprises:
causing display of a notification in response to receiving the subsequent data point, the notification including the data source identifier.

15. The method of claim 9, wherein the method further comprises:
receiving a third data point, the third data point including third vector data, the family identifier, and image data of an image;
causing display of the third data point on the base layer based on the third vector data;
receiving a selection of the third data point; and
causing display of the image based on the image data.

16. The method of claim 9, wherein the geospatial data includes a map image and a coordinate system.

17. A non-transitory machine-readable storage medium comprising instructions that, when executed by one or more processors of a machine, cause the machine to perform operations comprising:

causing a display of geospatial data at a client device, the display of the geospatial data including a base layer and a first graphical representation of a first data point overlaid on the base layer at a first location, the first graphical representation of the first data point comprising first vector data that identifies the first location on the base layer, and a family identifier that identifies a family definition, the family definition including a data retrieval interval;

receiving a user input that assigns the family identifier of the first vector data to a first data source;

retrieving a second data point from the first data source based on the data retrieval interval, in response to the user input that assigns the family identifiers to the first data source, the second data point including second vector data; and updating the display of the geospatial data to include a second graphical representation of the second data point overlaid on the base layer at a second location, the second location based on the second vector data.

18. The non-transitory machine-readable storage medium of claim 17, wherein the instructions cause the machine to perform operations further comprising:

receiving a user input defining a boundary within the base layer;

retrieving a set of data points on the base layer based on the boundary; and causing display of graphical representations of the set of data points on the base layer.

19. The non-transitory machine-readable storage medium of claim 17, wherein the geospatial data includes a set of data points, the set of data points including the family identifier of the first data point, the first data point and the set of data points including temporal data, and the instructions cause the machine to perform operations further comprising:

receiving a selection of the first data point;

causing display of an interface control element in response to the selection, the interface control element configured to receive a temporal constraint;

defining a limit of the temporal constraint via the interface control element; and updating the display of the geospatial data to include a portion of the set of data points based on the temporal constraint and the family identifier of the first data point.

20. The non-transitory machine-readable storage medium of claim 17, wherein the instructions cause the machine to perform operations further comprising:

receiving a selection of a data source;

assigning the family identifier to the data source;

defining a data update interval for the data source;

requesting, at the data update interval, temporal data and vector data from the data source; and causing display of a graphical representation of a subsequent data point based on the temporal and vector data from the data source.

\* \* \* \* \*